United States Patent [19]

Henschel

[11] 3,831,039

[45] Aug. 20, 1974

[54] SIGNAL RECOGNITION CIRCUITRY

[75] Inventor: John P. Henschel, White Bear Township, Ramsey County, Minn.

[73] Assignee: Minnesota Mining and Manufacturing Company, St. Paul, Minn.

[22] Filed: Oct. 9, 1973

[21] Appl. No.: 404,431

[52] U.S. Cl. .............. 307/234, 307/252 F, 328/112, 328/119, 340/167 A, 340/248 P

[51] Int. Cl. .............................................. H03k 5/20

[58] Field of Search ......................... 307/252 F, 234; 328/109–112, 119; 340/167 R, 167 A, 248 P

[56] References Cited

UNITED STATES PATENTS

| | | | |
|---|---|---|---|
| 3,139,539 | 6/1964 | Hewett | 307/234 |
| 3,634,869 | 1/1972 | Hsueh | 307/234 |
| 3,653,018 | 3/1972 | Budrys | 307/234 |
| 3,790,881 | 2/1974 | Smith | 307/234 |

*Primary Examiner*—Stanley D. Miller, Jr.
*Attorney, Agent, or Firm*—Alexander, Sell, Steldt & DeLaHunt

[57] ABSTRACT

Signal recognition circuitry provides a control signal which is initiated following the receipt of successive input signals provided they are spaced less than a first duration apart and have been received for at least a second duration with such control signal continuing for at least a third duration. A first pulse generator is controlled by the input signals and is used to assure that the spacing between pulses is proper by producing a pulse if the spacing is improper with such pulse being used to inhibit operation of a second pulse generator used to measure the second duration. The second pulse generator controls operation of a switching circuit and operation of a third pulse generator. If the second duration is satisfied, a pulse is provided by the second pulse generator causing the switching circuit to provide the control signal. The third pulse generator begins operation after the pulse has been provided by the second pulse generator and connects with the switching circuit to terminate the control signal in response to a pulse produced by the third pulse generator when it has been operating for said third duration.

6 Claims, 3 Drawing Figures

PATENTED AUG 20 1974 3,831,039

SIGNAL RECOGNITION CIRCUITRY

BACKGROUND OF THE INVENTION

1. Field of the Invention

The invention presented herein relates to signal recognition circuitry for recognition of repetitive pulse signals and more particularly to such circuitry for providing an output signal after acceptable repetitive pulse signals have been presented for at least a predetermined time.

2. Description of the Prior Art

U.S. Pat. No. 3,550,078 discloses a traffic signal remote control system in which a pulsed beam of high-intensity light transmitted at a predetermined frequency from an emergency vehicle is detected at a controlled traffic intersection and used to assume control of the traffic light signal controller for the intersection so a green light will be provided for the emergency vehicle. Such pulses of light are distinguished from the steady state ambient light by the use of a detector which responds only to light pulses which increase in intensity at a very fast rate. The possibility of the system responding to false signals is reduced further by integrating the signals received so a number of the pulses must be received within a short time to provide a signal of sufficient magnitude to cause the remote control system to assume control of the traffic light signal controller.

While the system disclosed in U.S. Pat. No. 3,550,078 provides some degree of signal discrimination, experience with a number of actual systems constructed in accordance with the patent indicated the need for better signal discrimination to eliminate occasional false operations that have occurred in response to low repetition rate light sources, fluorescent lights, neon signs, mercury vapor lamps and lightning flashes. It was also found that the signal discrimination provided by the system disclosed in the patent does not adequately discriminate between a series of equally spaced light pulses and a series of irregularly spaced light pulses. In addition, it was found that the time period of control of the traffic light controller following the termination of the transmission of light pulses which was provided by the disclosed system was unpredictable and sometimes too short. Further, system failures were experienced during low ambient temperatures.

SUMMARY OF THE INVENTION

The invention presented herein provides a signal recognition circuit for processing input pulse signals to produce a control signal that is initiated following the receipt of successive input pulse signals that are time spaced less than a first duration apart and have been received for at least a second duration with such control signal terminated after a time equal to a third duration following termination of any further control signal initiating successive input pulse signals. A preferred embodiment of the invention includes three pulse generators and two switching circuits. One pulse generator assures there will be no control signal produced if the repetition rate of the pulses received is too low, i.e., pulses are spaced greater than said first duration. Whenever pulses with such low repetition rate are received, the one pulse generator is effective to produce a pulse to operate the first of the two switching circuits causing it to provide a signal which inhibits operation of the second pulse generator. Assuming the input pulses have the necessary pulse repetition rate, the first switching circuit is operated by the input pulses to provide a signal which initiates operation of the second pulse generator and if the input pulse signals having the proper repetition rate are received for said second duration, the second pulse generator upon operating for said second duration provides a pulse to the second switching circuit causing it to produce the control signal. Once the control signal is initiated and further control signal initiating input pulses are not received, the third pulse generator which is connected to the second switching circuit operates for a time equal to the third duration at which time it supplies the second switching circuit with a pulse causing it to terminate the control signal. The third pulse generator thus assures continuance of the control signal for at least said third duration once the control signal has been produced.

It is possible to place further restrictions on the input pulses which must be met before they are effective to cause a control signal to be produced. Thus, it may be important to first make certain that the pulses contain a certain amount of energy before they are considered. The circuit of this invention in such case provides for amplification and integration of pulse signals received with the results of such amplification and integration applied to a level detector circuit, which if satisfied, provides a pulse which is applied to the first switching circuit and first pulse generator.

In addition, since the circuit may be used at low ambient temperatures, it is important that operation of the circuit not be impaired. In one embodiment of the invention, gated semiconductor switching devices are used in the second and third pulse generator circuits to which a reference voltage is applied. Low temperature operation is assured by the use of a fourth pulse generator as a sampling circuit which operates at a higher frequency than the second and third pulse generators. The fourth pulse generator is connected to each of the gates of the semiconductor switching devices used in the second and third pulse generators so that each pulse provided by the fourth pulse generator effects a slight reduction in gated reference voltage for the second and third pulse generators to assure low temperature operation.

BRIEF DESCRIPTION OF THE DRAWINGS

For a more complete understanding of the invention, reference should be made to the accompanying drawings, wherein.

DETAILED DESCRIPTION

Figures 1, 2, 3:
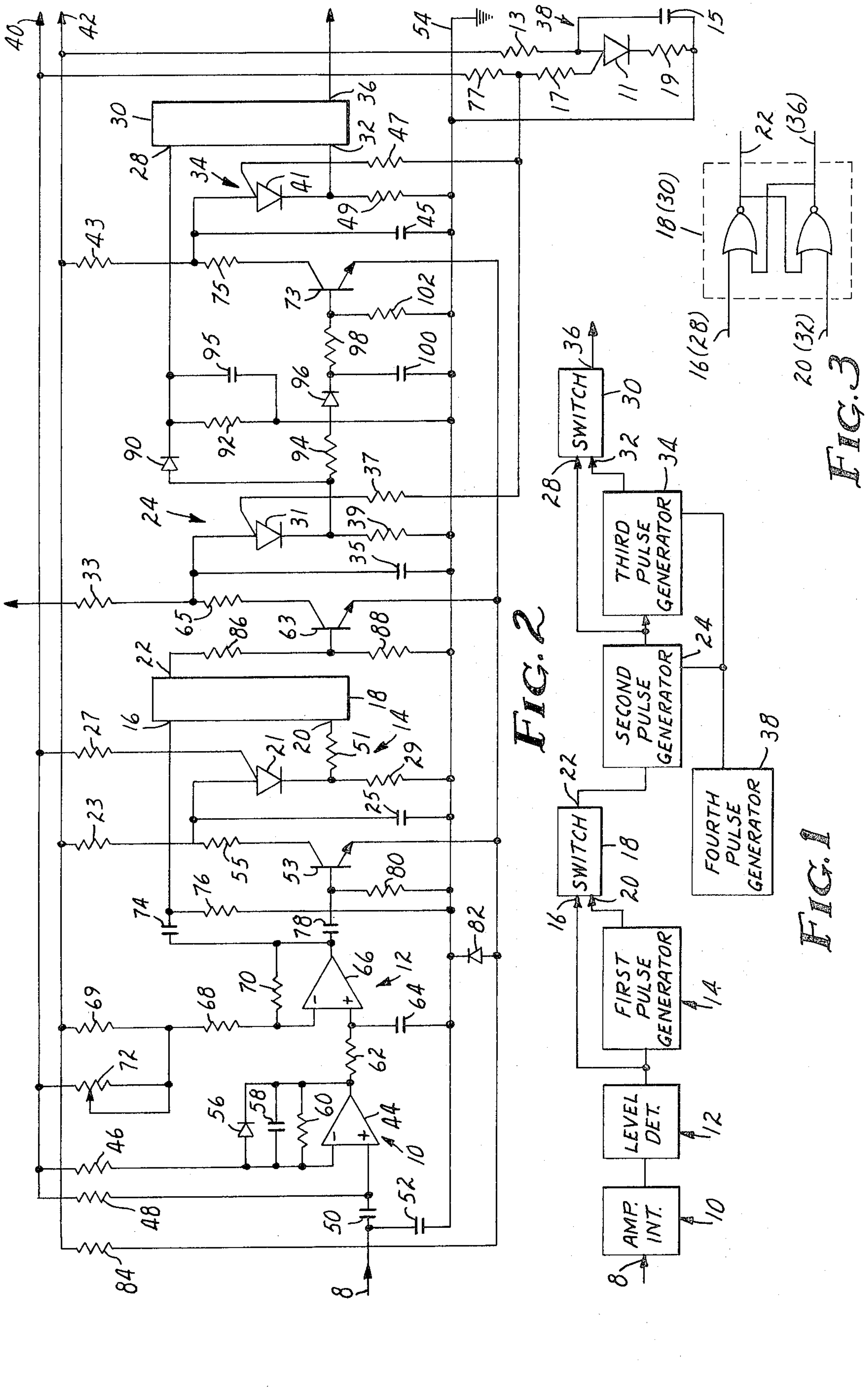
FIG. 1 is a block diagram of the signal recognition circuitry embodying the invention.
FIG. 2 is an exemplary circuit of the circuitry shown in block diagram form in FIG. 3.
FIG. 3 is a showing of an exemplary circuit for use in the circuit of FIG. 2.

A signal recognition circuitry is shown in FIG. 1 which includes an amplifier and integrator circuit portion 10 which with a level detector circuit portion 12 requires any pulse applied to the input 8 of amplifier integrator 10 to have a desired energy content before the pulse is recognized for further processing to distinguish such pulses from lower energy level pulses that may be applied. Each pulse provided at the output from the level detector 12 is applied to a first pulse generator 14 and to one control input 16 of a switching circuit 18 which also has a control input 20 to which the output of the first pulse generator 14 is connected. The switching circuit 18, which may be a bistable flip-flop circuit, presents a first signal at its output 22 upon receipt of a pulse at its input 20. Such first signal remains until a pulse is received at its input 16.

Operation of pulse generator 14 is inhibited when a pulse is presented to it from level detector 12. The operating frequency of the pulse generator 14 is such that it will provide a pulse to the input 20 of switching circuit 18 in the event an input pulse received by the pulse generator circuit 14 is not followed by another pulse within a first duration. Such first duration establishes the limit for the time space permitted between successive pulses if they are to be recognized. If such first duration criteria is not met by successive input pulses to pulse generator 14, the switching circuit 18 will present the first signal at its output 22 upon receiving a pulse from pulse generator 14.

A second pulse generator 24 is provided which has its operation inhibited when the output 22 of the switching circuit 18 is presenting the first signal, i.e., input 20 of circuit 18 was the last of inputs 16 and 20 to receive a pulse signal. If the output 22 of circuit 18 is not presenting the first signal, i.e., input 16 was the last of inputs 16 and 20 to receive a pulse signal, second pulse generator 24 is operative. Its frequency of operation is designed so as to provide a pulse a second duration after its operation is initiated. Since operation of the second pulse generator 24 is inhibited when a pulse is produced by the first pulse generator 14 to cause the switching circuit 18 to present the first signal at its output 22, it is necessary that successive input pulses to the first pulse generator 14, all satisfying the time space limitation for successive pulses, be presented to prevent pulse generator 14 from producing a pulse. If such successive pulses are provided for at least a period of time equal to the second duration, the pulse generator 24 will have provided a pulse at its output.

A second switching circuit 30, similar to the first switching circuit 18 is provided. The output of the second pulse generator 24 is applied to one control input 28 while a second control input 32 of circuit 30 is connected to the output of a third pulse generator 34. An output 36 of switching circuit 30 provides the output or control signal for the signal recognition circuit of FIG. 1 in response to a signal applied to input 28 which control signal continues until terminated in response to a signal applied to input 32 of circuit 30. Accordingly, when the second pulse generator 24 has operated to provide a pulse to input 28 of circuit 30 in response to the duration and spacing criteria of input pulses from level detector 12 having been satisfied, the control signal is provided at 36. Operation of the third pulse generator 34 is initiated following termination of a pulse from the second pulse generator 24 and has a frequency of operation designed so as to provide a pulse a third duration after its operation is initiated. Accordingly, the third pulse generator 34 will provide a pulse to input 32 of switching circuit 30 a third duration after a pulse has been produced by generator 24 to terminate the control signal at 36.

A fourth pulse generator 38 is shown which is connected to each of the second and third pulse generators 24 and 34. The pulse generator 38 serves as a sampling circuit and assures proper operation of the circuitry at low ambient temperatures by frequently supplying reference voltage modifying pulses to the pulse generators 24 and 34. This aspect will be described more fully in connection with description to be given of the circuit details shown in FIG. 2.

The circuit as described will operate to provide a control signal at output 36 provided successive input pulses are received for at least the second duration established by pulse generator 24 and the time between such successive pulses are less than the first duration established by pulse generator 14 with such control signal at 36 continuing for at least the third duration provided by pulse generator 34. For purposes of providing a summarizing description of the operation of the circuit shown in FIG. 1, it will be assumed that it is desired that a control signal is to be provided at output 36 provided successive input pulses which satisfy the level detector 10 are received for at least 1½ seconds with the duration between successive input pulses being less than 120 milliseconds and that after the pulses successive input satisfying the 1½ second requirement have been received, the initiated control signal at output 136 will continue for at least 9 seconds. The 120 millisecond duration limitation is provided by pulse generator 14, the 1½ second duration requirement by pulse generator 24 and the 9 second duration requirement by pulse generator 34.

Prior to the receipt of any pulse signals, pulse generator 14 and pulse generator 34 are operating. Operation of pulse generator 14 provides a signal to the first switching circuit 18 causing it to provide a signal at its output 22 which inhibits operation of pulse generator 24. Pulse generator 34 will have provided a control pulse to input 32 of the second switching circuit 30 so its output 36 will not be providing tqe control signal.

Assume then that successive input pulses are received for a time less than 1½ seconds, say 1 second, which are spaced less than 120 milliseconds apart with the next input pulse after such 1 second period received at a time greater than 120 milliseconds. In this case, the switching circuit 18 receives the pulses at input 16 to terminate the inhibiting signal from its output 22 allowing pulse generator 24 to begin operation. In addition, each pulse received for the 1 second period is applied to pulse generator 14 causing its operation to be inhibited. Upon termination of the last pulse in the 1 second succession of pulses, pulse generator 14 begins operation and provides a pulse to input 20 of circuit 18 since the next inhibiting input pulse to pulse generator occurs more than 120 milliseconds after initiation of the operation of pulse generator 14. The pulse applied to the input 20 of the switching circuit 18 causes it to provide an output at 22 which is effective to inhibit operation of pulse generator 24. The circuit must therefore examine the next succession of pulses to determine whether they satisfy the 1½ second and 120 millisecond spacing requirements criteria set forth earlier to have the circuit cause the desired control signal to be produced at output 36.

Assuming then that the next group of successive pulses is received from the level detector 12 for at least 1½ seconds, with each pulse occurring within 120 milliseconds of the previous pulse, the pulse generator 24 will have produced a pulse 1½ seconds after the group of successive pulses began. Such pulse from generator 24 inhibits pulse generator 34 while it is present and is also applied to input 28 of switching circuit 30 to cause the output at 36 to provide the control signal indicative of the receipt of signals of the type desired to be recognized as outlined earlier. The termination of the pulse from pulse generator 24 initiates operation of pulse generator 34 which 9 seconds after its operation is initiated provides a pulse to input 32 of circuit 30 to terminate the control signal at the output 36.

The circuit shown in detail in FIG. 2 is exemplary of the circuit set forth in block diagram form in FIG. 1. Where applicable, like reference numerals are used in FIG. 2 to identify circuit portions corresponding to those set forth in FIG. 1.

The circuit of FIG. 2 is energized by a d.c. supply (not shown) which provides one level of positive voltage to conductor 40 and a higher voltage level to conductor 42. In the case of an actual circuit constructed in accordance with this invention, the voltage applied to conductor 40 was 12 volts positive and the voltage applied to conductor 42 was 24 volts positive. The amplifier-integrator circuit 10 includes an operational amplifier 44 which has its negative input terminal connected to the voltage supply conductor 40 via a resistor 46. The positive input terminal for the operational amplifier is similarly connected to conductor 40 by a resistor 48. The received input pulses are applied to input terminal 8 and are coupled to the positive input terminal of the operational amplifier 44 by the D.C. blocking capacitor 50. An R.F. by-pass capacitor 52 is connected between the input terminal 8 and the ground connection 54 for the circuit. A feedback loop is provided which includes diode 56, capacitor 58 and resistor 60, each connected between the output of the operational amplifier 44 and the negative input. This feedback loop with resistor 46 causes the operational amplifier 44 to integrate high frequency pulse signals in the positive direction which are received at the input terminal 8. The output of the operational amplifier 44 is integrated further by the resistor 62 connected at one end to the output of amplifier 44 and capacitor 64 which is connected between the other end of resistor 62 and ground.

The level detector 12 includes an operational amplifier 66 which may be of the same type used for operational amplifier 44. The positive input terminal for operational amplifier 66 is connected to the connection common to resistor 62 and capacitor 64, while the negative input is connected to the voltage supply line 42 via the series connected resistors 68 and 69. A feedback resistor 70 is connected between the output of the operational amplifier 66 and the negative input. The level of the signal that must be presented to the positive input terminal with respect to the negative input terminal to cause operational amplifier 66 to have an output is determined by the setting for the potentiometer 72 which is connected between the power supply line 40 and the connection common to resistors 68 and 69. Accordingly, when a signal from operational amplifier 44 presents a voltage to the operational amplifier 66 which is above the reference voltage provided at the negative input terminal, the output of the operational amplifier will move in a positive direction. The output of the operational amplifier 66 is coupled to the input terminal 16 of the switching circuit 18 via capacitor 74 and resistor 76 which is connected from input 16 to ground. A similar coupling circuit is used to connect the output of the operational amplifier 66 to the pulse generator 14 and includes capacitor 78 and resistor 80.

The pulse generator 14 utilizes a programmable unijunction transistor (PUT) 21 which provides a pulse at its cathode each time it conducts as determined by the resistor 23, capacitor 25 and the gate reference voltage obtained from the power supply conductor 40 via resistor 27. When the anode-gate junction becomes forward biased, the PUT 21 regenerates or "fires." The cathode of PUT 21 is connected to the ground conductor 54 via a resistor 29 with a resistor 51 connected between the cathode and to the input 20 of switching circuit 18 to apply the pulses developed.

It has been indicated that the pulse generator 14 does not operate when a pulse is presented to it from the level detector 12. The pulse generator 14 includes a transistor 53, which when conducting, shorts out the capacitor 25 to provide such inhibiting action. The emitter of transistor 53 is connected to the ground conductor 54 via a diode 82. The anode of the diode 82 is connected to the power supply conductor 42 via a resistor 84. The diode 82 and resistor 84 serve to back bias the transistor 53 to assure its turn off over a large temperature operating range. The collector of transistor 53 is connected via a resistor 55 to the connection common to resistor 23 and capacitor 25. Transistor 53 conducts when a positive signal is received at its base electrode from the level detector circuit portion 12 and when conducting effectively shorts out capacitor 25 to remove any charge that has accumulated on capacitor 25. In the absence of a positive signal at the base of transistor 53, the capacitor 25 is allowed to charge via the resistor 23 to develop the necessary forward biasing voltage for the anode-gate junction of the PUT 21 to cause it to "fire."

Except for the fact that pulse generators 24 and 34 are designed to operate at different frequencies from that provided by the pulse generator 14, they are very similar and like elements for pulse generator 24 are identified using reference numerals that are increased by a factor of 10 over those used for pulse generator 14, while like elements for pulse generator 34 are identified by using reference numerals that are increased by a factor of 20. Since a circuit embodying this invention can be used in a traffic signal remote control system of the type described in U.S. Pat. No. 3,550,078 and more than one circuit would be employed at a traffic intersection making it necessary that only one circuit respond to transmitted pulses at any one time, resistor 33 for pulse generator 24 is therefore not connected to the power supply conductor 42 as is the case for corresponding resistors 23 and 43. It connects to a positive voltage source (not shown) dependent on whether the signal recognition circuit connected with resistor 33 is to be operative. The pulse generators 24 and 34 also differ from a pulse generator 14 in that the gate reference voltages for PUT 31 and PUT 41 are modified by the operation of pulse generator 38 to which the gate electrodes for PUT 31 and 41 are connected. The pulse generator 38 is also a programmable unijunction transistor type oscillator having the same general configuration as that described in connection with the pulse generator 14 except that it does not have an inhibiting circuit. Various elements of pulse generator 38 which correspond to similar elements in pulse generator 14 are identified using reference numerals hich re reduced by a factor of 10 from the reference numbers used for like elements of pulse generator 14. Unlike the gate resistor 27 of pulse generator 14, the gate electrode resistor 17 of pulse generator 38 is connected to the power conductor 40 via an additional series connected resistor 77. The gate electrode resistors 37 and 47 of pulse generators 24 and 34, respectively, are connected to the connection common to resistors 17 and 77. The pulse generator 38 acts as a sampling circuit since it drops the gate reference voltage for the PUT 31 and 41 of pulse generators 24 and 28, respectively, each time PUT 11 of generator 38 "fires." The firing rate for the pulse generator 38 is made high enough so that the sampling action takes place often enough to assure low temperature operation of the circuit.

The switching circuits 18 and 30 may be bistable flip-flop circuits formed using NOR circuits connected in a well known manner in accordance with the schematic of FIG. 3. The various input and output terminals for the flip-flop circuit of FIG. 3 are identified using the reference numerals associated with switching circuits 18 and 30 of FIG. 2. The reference numerals shown in brackets correspond to the reference numerals used for switching circuit 30. In the case of an actual circuit constructed in accordance with this invention, the two flip-flop circuits 18 and 30 were obtained using a single integrated circuit containing four NOR elements such as is available from the Radio Corporation of America under the type designation CD4001AE. Referring to FIG. 3, the operation of the flip-flop circuit is such that if control terminal 16 (28) receives a signal, the output terminal (36) presents a positive voltage signal while the output terminal 22 is at zero potential. Similarly, a signal presented to the terminal 20 (32) causes the output terminal 22 to present a positive voltage signal while output terminal (36) is at zero potential.

The coupling of the output 22 of switching circuit 18 to pulse generator 24 is accomplished by resistors 86 and 88 connected in series between output 22 and ground with the base of transistor 63 connected to the connection common to resistors 86 and 88.

The pulse generator 24 is coupled to the input 28 of switching circuit 30 via a diode 90 having a resistor 92 connected to ground from the cathode side of the diode with a capacitor 95 similarly connected. The coupling to input 28 shown in FIG. 2 need only be resistor which would be connected in place of the diode 90. The coupling shown in FIG. 2 uses the diode 90 since some applications of the circuit involve the momentary application of a positive voltage to input 28 which is applied from a source not shown to the cathode side of diode 90. The voltage is developed across resistor 92 and capacitor 95 serves as a by-pass for any transient signals that might be received from the voltage source which is not shown.

The coupling of pulse generator 24 to the base of transistor 73 of pulse generator 34 is accomplished by a series circuit including resistor 94, diode 96 and resistor 98 with a capacitor 100 connected to ground from the connection common to diode 96 and resistor 98 and with a resistor 102 connected to ground from the base electrode of transistor 73. This coupling circuit serves to stretch the pulse developed when the PUT 31 of pulse generator 24 fires by integrating it. The pulse from PUT 31 otherwise would not cause transistor 73 to conduct for a time sufficient to discharge capacitor 45 to inqrkr3 operation of the pulse generator 34.

Using the circuit shown in FIG. 2 over a temperature with range of −40°C to +85°C values for the various elements and of the types indicated below the pulse generator 14 provides a first duration of about 110 to 137 milliseconds, pulse generator 24 provides a second duration of about 1.35 to 1.7 seconds and pulse generator 34 a third duration of about 6.3 to 10 seconds. Pulse generator 38 fires about every 10 milliseconds.

| | |
|---|---|
| Diodes (all) | 1N4148 |
| Operational Amplifiers 44, 66 | μA741 (Signetics) |
| Switching Circuits 18, 30 | Integrated Circuit type CD 4001 AE (RCA) |
| PUT 11, 21, 31, 41 | 2N6028 |
| Transistors 53, 63, 73 | 2N4409 |
| Resistors | |
| 55, 65, 75 | 47 ohms |
| 19, 29, 39, 49, 94 | 100 ohms |
| 77 | 470 ohms |
| 51, 98 | 1K ohm |
| 68 | 2K ohms |
| 80 | 4.7K ohms |
| 46, 72, 76, 102 | 10K ohms |
| 62, 69 | 15K ohms |
| 17, 84, 88 | 22K ohms |
| 27, 48 | 47K ohms |
| 37, 47, 92 | 100K ohms |
| 60 | 150K ohms |
| 13 | 1.5M ohms |
| 23 | 1.8M ohms |
| 70 | 2.2M ohms |
| 33, 43 | 22M ohms |
| Capacitors | |
| 50, 94 | .001 microfarad |
| 15, 58, 95 | .01 microfarad |
| 64 | .022 microfarad |
| 78 | .033 microfarad |
| 25, 35, 50, 100 | .1 microfarad |
| 45 | .56 microfarad |

While only one embodiment of the invention has been illustrated and described herein, it is realized that modifications and changes will occur to those skilled in the art. It is, therefore, to be understood that the appended claims are intended to cover all such modifications and changes as fall within the true spirit and scope of the invention.

What is claimed is:

1. Signal recognition circuitry for processing input pulse signals comprising:

a first pulse generator for producing pulses spaced by a time equal to a first duration, said first pulse generator having an input connected to receive the input pulse signals, said input pulses when present inhibiting the operation of said first pulse generator;

a first switching circuit connected for receiving the input pulse signals and pulses from said first pulse generator, said first switching circuit providing an output at which a first signal is produced in response to receipt of a pulse from said first pulse generator, said first switching circuit terminating said first signal in response to receipt of an input pulse signal;

a second pulse generator for producing pulses spaced by a time equal to a second duration, said second pulse generator having an input connected to said output of said first switching circuit, said first signal when present inhibiting the operation of said second pulse generator;

a third pulse generator for producing pulses spaced by a time equal to a third duration, said third pulse generator having an input connected for receiving pulses from said second pulse generator, said pulses from said second pulse generator when present inhibiting the operation of said third pulse generator; and a second switching circuit connected for receiving pulses from said second and third pulse generators, said second switching circuit having an output for the recognition circuitry at which a control signal is presented in response to receipt of a pulse from said second pulse generator, said second switching circuit terminating said control signal in response to receipt by said second switching circuit of a pulse from said third pulse generator whereby said control signal is initiated following the presentment to the signal recognition circuitry of successive input pulse signals that are time spaced less than said first duration apart with such input pulses presented for at least said second duration with said control signal continuing for a time at least equal to said third duration.

2. Signal recognition circuitry in accordance with claim 1 wherein said first duration is less than said second duration and said second duration is less than said third duration.

3. Signal recognition circuitry in accordance with claim 1 wherein said switching circuits are bistable flip-flop circuits.

4. Signal recognition circuitry in accordance with claim 1 wherein second and third pulse generators each include a programmable unijunction transistor.

5. Signal recognition circuitry in accordance with claim 4 wherein said programmable unijunction transistors, each have a gate electrode connected to a reference voltage source, said recognition circuitry further including a fourth pulse generator having an operating frequency in excess of said second and third pulse generators, said fourth pulse generator connected to said gate electrodes for changing the voltage thereat in accordance with the frequency of operation of said fourth pulse generator whereby said fourth pulse generator serves as a sampling circuit to assure operation of said second and third pulse generators at low ambient temperatures.

6. Signal recognition circuitry in accordance with claim 1 wherein at least one of said pulse generators includes a resistor and a capacitor for establishing the duration provided by said pulse generator and includes a transistor connected to said capacitor and to said input of said pulse generator, said transistor conducting in accordance with the signal presented at said input and when conducting causing any charge on said capacitor to be removed whereby operation of said one pulse generator is inhibited.

* * * * *

UNITED STATES PATENT OFFICE
CERTIFICATE OF CORRECTION

Patent No. 3,831,039 dated August 20, 1974

Inventor(s) John P. Henschel

It is certified that error appears in the above-identified patent and that said Letters Patent are hereby corrected as shown below:

Column 4, line 36, change "tqe" to --the--.

Column 6, line 67, change "hich re" to --which are--.

Column 7, line 67, change "inqrk3" to --inhibit--.

Signed and sealed this 5th day of November 1974.

(SEAL)
Attest:

McCOY M. GIBSON JR.
Attesting Officer

C. MARSHALL DANN
Commissioner of Patents